June 5, 1923. 1,457,973
W. E. HALE
BRAKE AND CLUTCH OPERATING MECHANISM FOR HOISTS
Filed Sept. 30, 1922 2 Sheets-Sheet 1

Inventor—William E. Hale.
by his Attorneys,

June 5, 1923.
W. E. HALE
BRAKE AND CLUTCH OPERATING MECHANISM FOR HOISTS
Filed Sept. 30, 1922    2 Sheets-Sheet 2
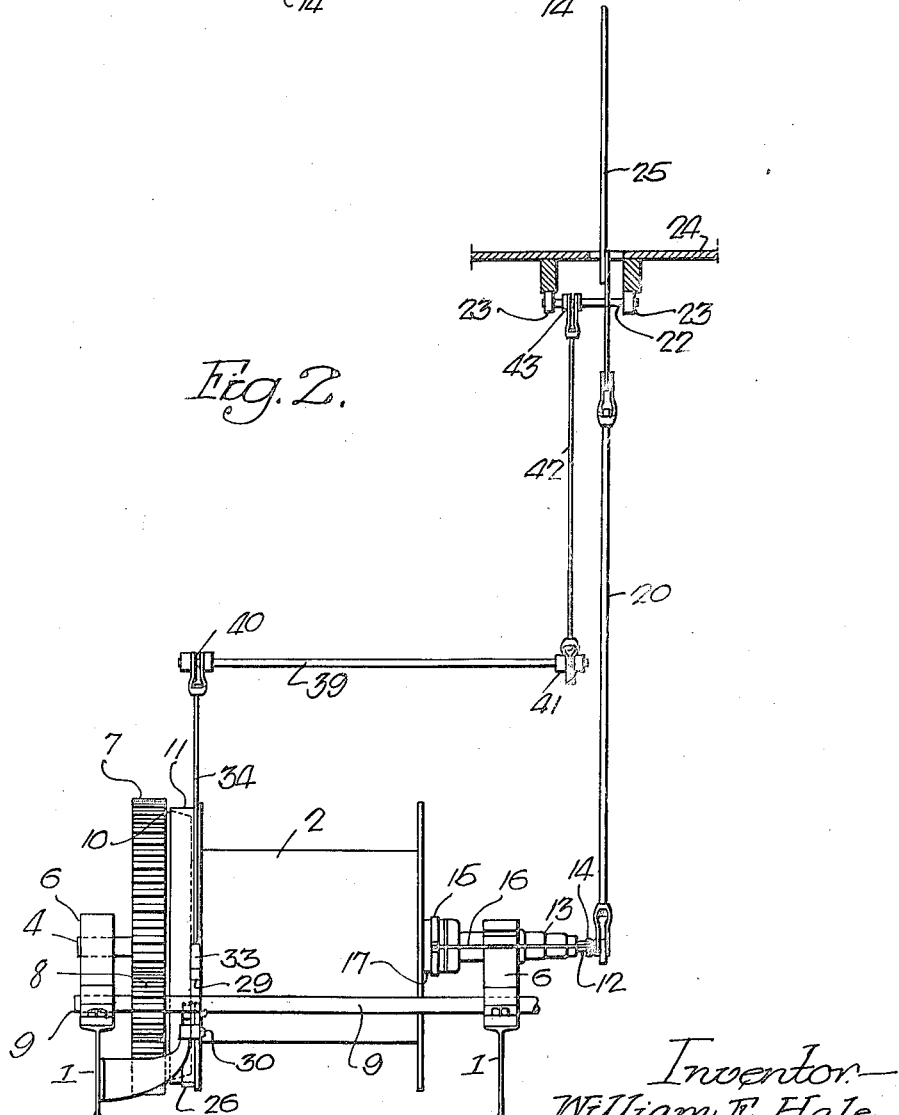
Inventor
William E. Hale
by his Attorneys Patented June 5, 1923.

1,457,973

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

BRAKE AND CLUTCH OPERATING MECHANISM FOR HOISTS.

Application filed September 30, 1922. Serial No. 591,520.

*To all whom it may concern:*

Be it known that I, WILLIAM E. HALE, a citizen of the United States, residing in Fort Washington, Montgomery County, Pennsylvania, have invented certain Improvements in Brake and Clutch Operating Mechanism for Hoists, of which the following is a specification.

My invention relates to certain improvements in brake and clutch operating mechanism for hoists, especially those having two drums.

The object of my invention is to construct the apparatus so that when one clutch is shifted to drive one drum, the brake of that drum is released automatically, while the brake of the other drum holds it from turning.

This object I attain in the following manner, reference being had to the accompanying drawings, in which:

Fig. 2 is an end view, showing the flooring of the operator's platform in section; and Fig. 3 is a plan view of a portion of the mechanism shown in Fig. 1.

Figure 1:
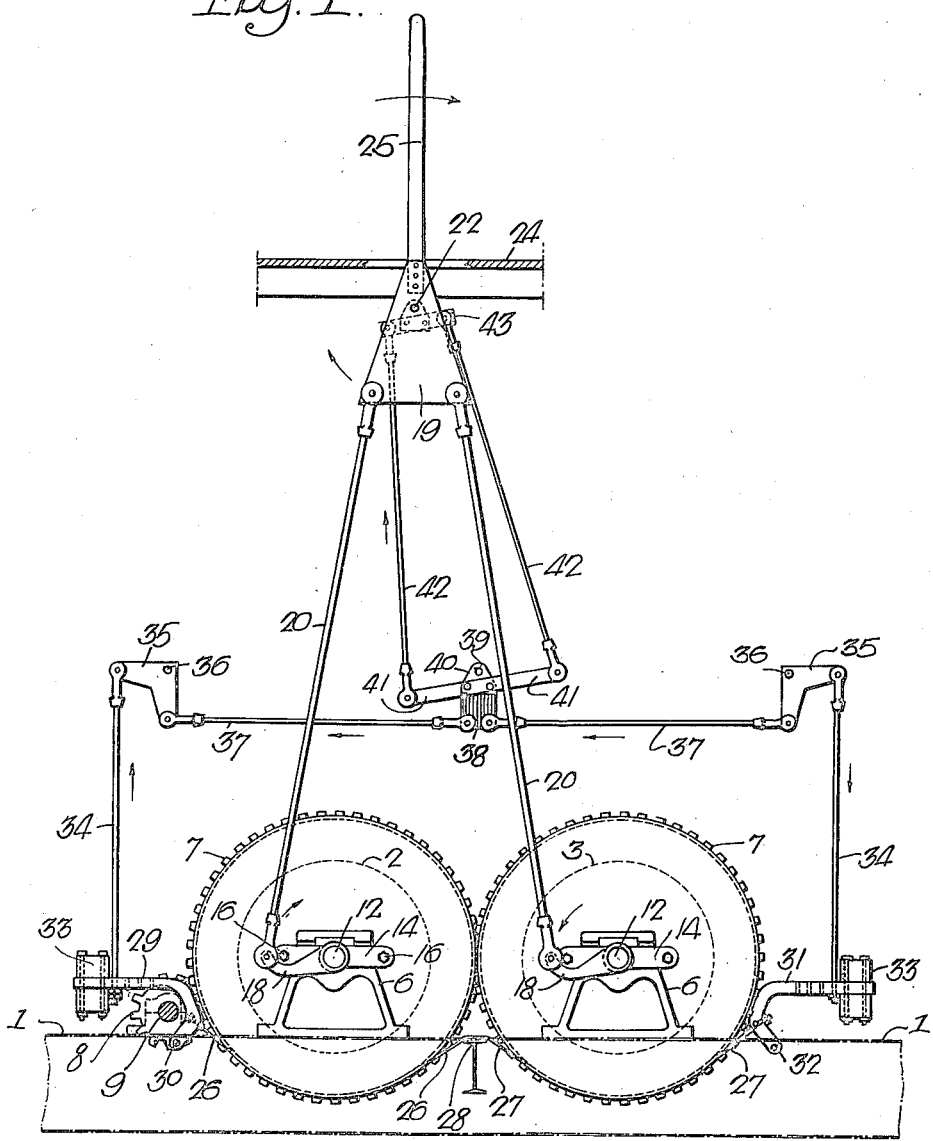
Fig. 1 is a side view of my improved brake and clutch operating mechanism for hoists.

Referring to the drawings, 1, 1 are beams forming the base of the hoist structure. 2 and 3 are hoisting drums of the ordinary type having shafts 4 and 5, respectively, which are mounted in bearings 6 on the beams. 7 is a driving gear for each shaft. These gears are loose on the shaft. One of these gears is driven from a pinion 8 on a power driven shaft 9 having its bearings on the base of the hoist.

Each gear wheel 7 has a cone portion 10, which extends into a recess in the head 11 of each drum and forms the clutch by which the drum is driven from the gear when the drum is moved longitudinally on the shaft towards the gear. This is the ordinary construction of hoisting drums of the type to which my invention relates. In the present instance, the drums are moved to and from the gear wheel by a screw 12 mounted in a projecting portion 13 of the bearings 6 on one side of the hoist. On this screw is a cross head 14 connected to a cross head 15 by rods 16. The cross head 15 engages the hub 17 on the drum, as clearly shown in Fig. 2, so that, when the screw is turned in one direction, the drum will be forced into frictional contact with the conical portion of the gear wheel and will be driven by the gear wheel, but, when the screw is turned in the opposite direction, the drum is retracted, allowing the gear wheel to turn freely, without imparting movement to the drum.

On each screw is an arm 18. Each arm is connected to a lever 19 by rods 20. The lever is mounted on a pivot shaft 22. This pivot shaft is mounted in bearings 23 secured, in the present instance, to the under side of the operator's platform 24. Secured to the lever 19 is an operating arm 25 by which the lever and the shaft are turned.

When the operating arm is moved in the direction of the arrow, Fig. 1, the screw 12 of the drum 2 is moved in the direction of the arrow, forcing the drum in frictional contact with the gear wheel, while the screw 12 of the drum 3 is moved in a reverse direction, withdrawing the drum from its gear wheel.

26 and 27 are brake bands, which are arranged to encircle partially portions of the drums 2 and 3, respectively. These bands are anchored to a beam 28 located midway between the drums and the band 26 is attached to a lever 29 pivoted at 30, while the band 27 is attached to a lever 31 pivoted at 32. Each lever 29 and 31 is provided with a weight 33, which may be regulated as desired so as to increase or diminish the pressure of the brake bands on the drum. Each lever 29 and 31 is connected by a rod 34 to a bell crank lever 35 pivoted at 36 to any fixed point. The other arm of each bell crank lever is connected by a rod 37 to an arm 38 secured to a pivot shaft 39. On the opposite end of this shaft is a lever 40 having arms 41 connected by rods 42 to the arms of a lever 43 secured to the pivot shaft 22.

When the operating arm 25 is moved in the direction of the arrow, Fig. 1, then the lever 40 is moved in the direction of its arrow, causing the brake band 26 to release the drum 2, while the brake band 27 is unaffected and remains in contact with the drum 3. When the operating arm is reversed, then the brake band 26 is applied and the band 27 is released.

From the above construction, it will be seen that the brakes are automatically released as soon as the particular drum is moved in contact with the driving mechanism and each band is automatically applied when its drum is released from the operating mechanism.

I claim:

1. The combination in a power driven hoist, of two drums; means for driving the drums including clutch mechanism; brake mechanism for each drum; and a single operating means controlling the clutch mechanism and the brake mechanism so that, when one clutch is moved to couple the drum to the power driven mechanism, the brake of said drum will be automatically released.

2. The combination in hoisting mechanism, of a base; two drums mounted on the base; two gear wheels; means for driving the gear wheels; clutch mechanism between the gear wheels and drums; mechanism for moving the drums to and from the gear wheels; screw mechanism; an arm forming part of each screw mechanism; a lever; rods connecting said lever with the arms of the two screw mechanisms; an operating rod for the lever, the parts being so arranged that when the lever is moved in one direction, one drum is moved in frictional contact with a gear wheel and the other arm is withdrawn from a gear wheel; two band brakes, one for each drum; a lever attached to each band brake and rod; and lever mechanism connecting said brake levers with the operating arm so that when one drum is moved into frictional contact with its gear wheel, the brake of that drum is automatically released without affecting the other brake mechanism.

WILLIAM E. HALE.